March 25, 1941.   W. W. DODGE, JR   2,235,830
LATCH CONTROL MECHANISM FOR MOTOR VEHICLES
Filed Sept. 9, 1939   3 Sheets-Sheet 1
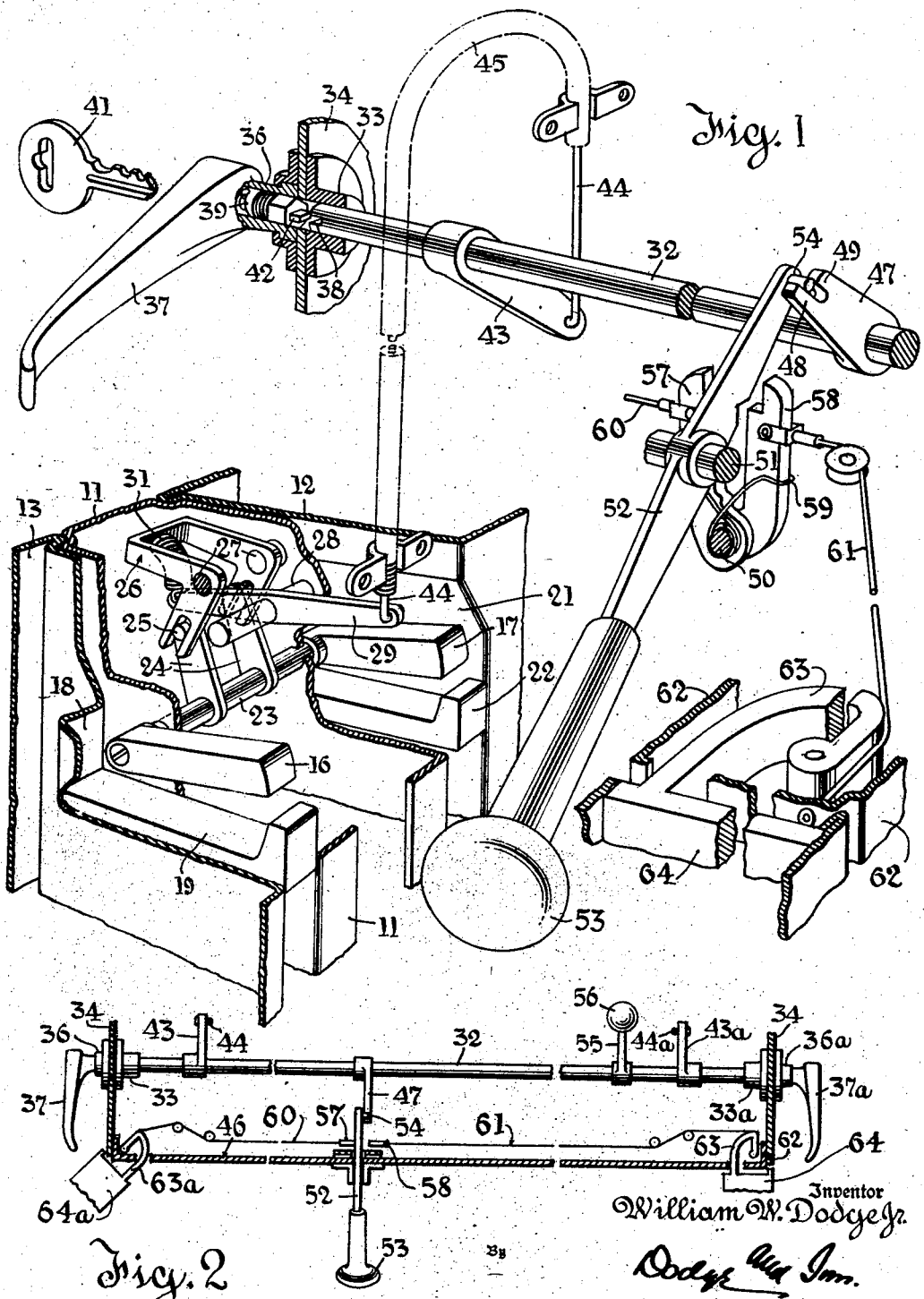

March 25, 1941. W. W. DODGE, JR 2,235,830
LATCH CONTROL MECHANISM FOR MOTOR VEHICLES
Filed Sept. 9, 1939 3 Sheets-Sheet 2
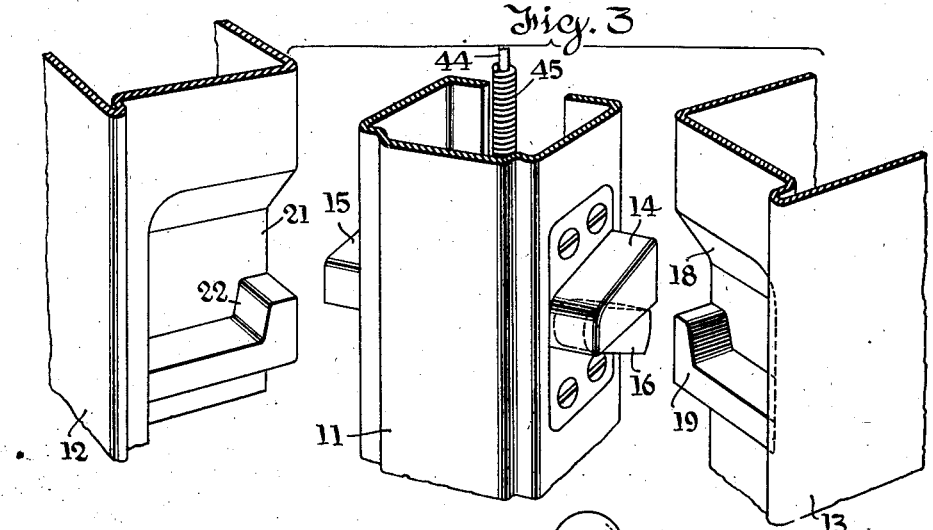
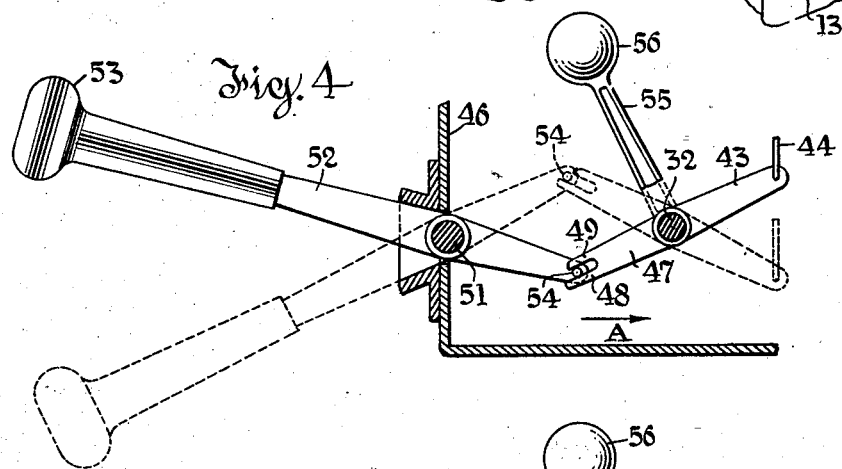
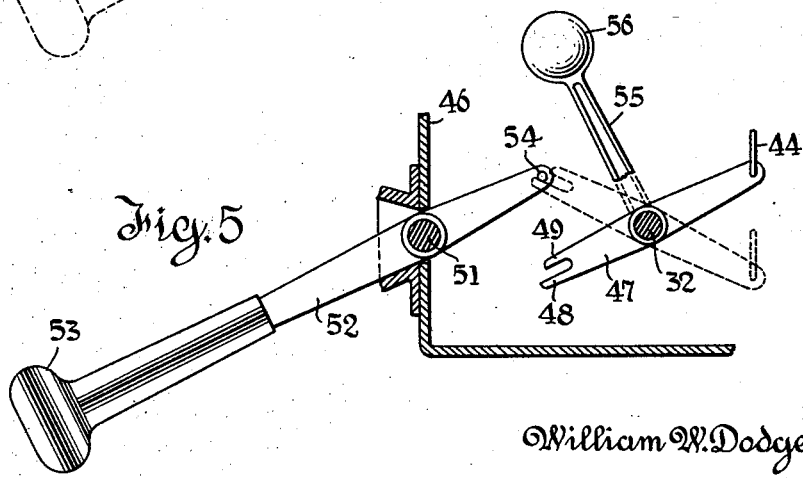
Inventor
William W. Dodge Jr.
By
Attorneys

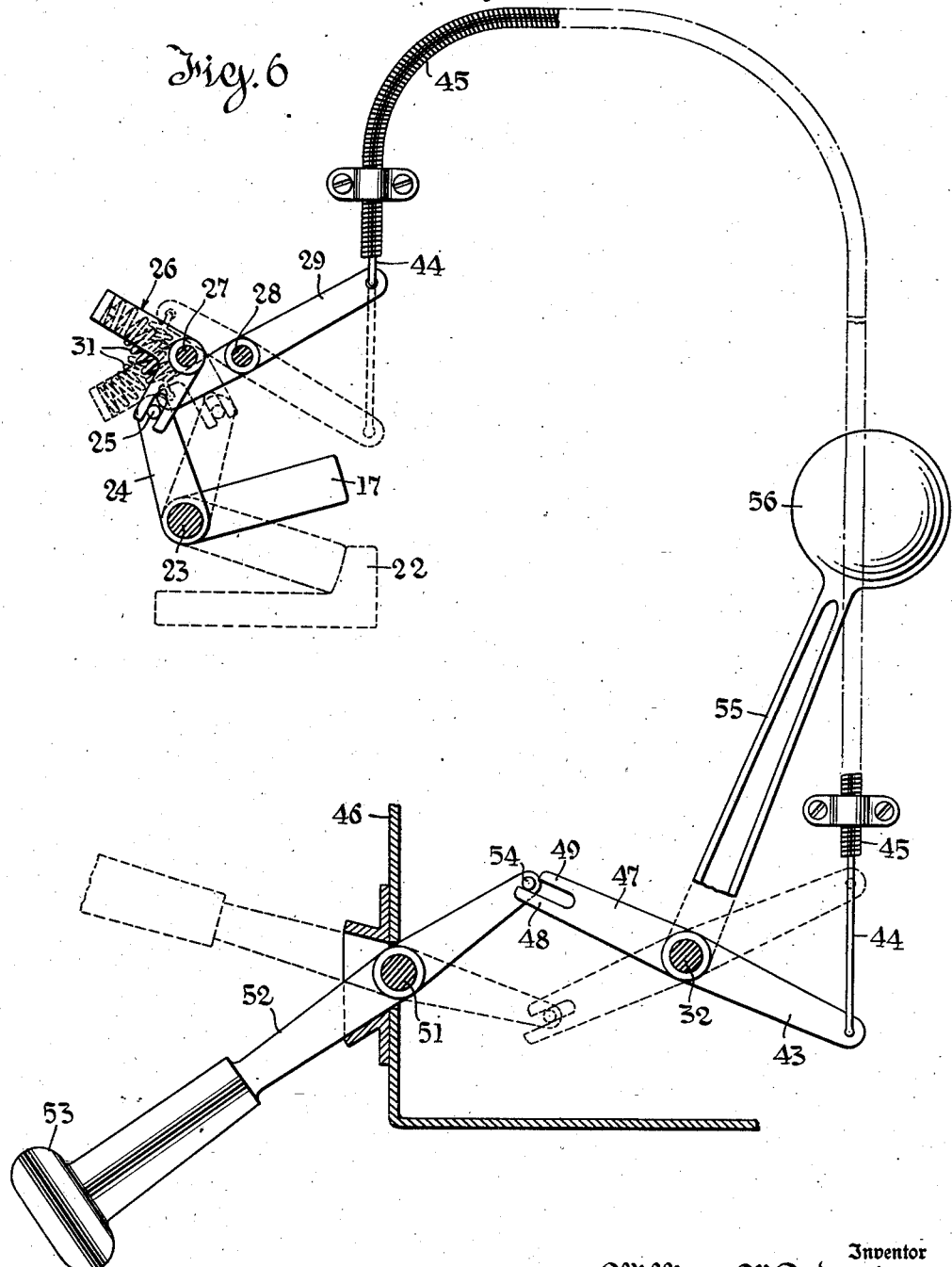

Patented Mar. 25, 1941

2,235,830

UNITED STATES PATENT OFFICE 2,235,830

LATCH CONTROL MECHANISM FOR MOTOR VEHICLES

William W. Dodge, Jr., Asheville, N. C.

Application September 9, 1939, Serial No. 294,184

19 Claims. (Cl. 70—264)

This invention relates to a multiple auxiliary latching mechanism by which an operator of an enclosed automobile or other vehicle may condition a plurality of latches, for example, one for each of four doors of an ordinary sedan, so that the latches will all engage or all disengage at the will of the operator.

When the latches are inactive they are retracted and consequently completely out of action. These latches are supplementary to and entirely independent of the ordinary handle-operated latches on the doors, but they make it possible to eliminate from the ordinary door latches any locking mechanism or latch dogging mechanism whatsoever.

While the device is primarily intended to lock the side doors of an automobile it can be used in the same way to lock any closure on the automobile; for example, closures to glove compartments, baggage carriers, the hood, and so forth. All of these details would involve mere duplication of the mechanism shown on the drawings and no attempt is here made to illustrate them.

Each latch mechanism is controlled by a toggle spring device which can be set in two positions, in one of which it biases the latches toward an active position; so they serve as ordinary spring-urged snap latches which engage if the door is closed or engage when an open door is closed. In its other position the toggle mechanism simply withdraws the latches to an inactive position and holds them yieldingly in such position. One toggle spring device can control latches for two doors if the jambs for the two doors form a common structure. When this is done some economy in construction can be achieved. The invention will be described as so embodied, it being obvious that if only one latch is to be controlled it is a matter of simple elimination to omit the second latch.

An important feature of novelty in the invention is the actuating mechanism by which all the latches are set in active condition or inactive condition simultaneously. According to the preferred construction a rock-shaft is mounted within and across the car. There are handles outside the car extending into the body, each of which may be locked by the use of a key into actuating engagement with the rock-shaft, or similarly, may be unlocked from the rock-shaft.

These handles are called hereinafter "outside actuating handles" and are the only means accessible outside the car for actuating the rock-shaft. Normally disengaged, either such handle may be engaged by the use of the ignition switch key to actuate the system in either direction, rendering the latches active or inactive. This means that the driver may lock the car outside from either side and unlock it later from the same or opposite side.

To connect and disconnect each outside actuating handle to the rock shaft, an ordinary cylinder lock is used. This lock is preferably of the type in which the key is retained in the lock so long as the handle remains connected to the rock shaft. This requires the operator to disengage the handle before the ignition switch key becomes available for use in starting the car.

The rock-shaft and connections are not accessible within the car, being housed behind the instrument panel, or under the hood if it is to be locked. An actuating handle, hereinafter called the "inside actuating handle," extends from the rock-shaft housing and is the only means accessible within the car to actuate the rock-shaft.

The connection between the inside actuating handle and the rock-shaft is such that if the rock-shaft is set to latch-engaging position by operating either outside actuating handle, the inside actuating handle is automatically disconnected from the rock-shaft. That is, rendering the door latches active by the outside actuating handle disengages the inside actuating handle, so that even though it be reached through an open or broken window it cannot be manipulated to unlock the doors. To restore the inside actuating handle to active condition it is necessary to shift the rock-shaft by one of the outside actuating handles to latch-retracting position.

Another important feature of novelty in the preferred form is a means to dog the inside actuating handle in latch-retracting position through opening either front door. It may be dogged directly, or it may be dogged indirectly by dogging any connected member such as the rock-shaft. Since the latches must be retracted before the doors can be opened to leave the vehicle and are maintained so when a front door is open, and since the ignition key must be used to lock the system from the outside, it is impossible to lock the car when the key is inside.

Upon leaving, then, the driver uses the ignition key to lock all the doors by means of the convenient outside actuating handle. Upon returning he unlocks them by use of the same key in the same or opposite outside actuating handle. Upon entering, the inside actuating handle remains dogged so long as either front door is open but becomes immediately operable upon the closing of both front doors. He cannot start the car without the key, and he cannot withdraw the key from the outside actuating handle until he has disengaged the handle from the rock-shaft.

A weighted arm in connection with the rock-shaft is so positioned as to disengage the door latches upon impact from collision, operating the rock-shaft through inertia. It is returned to initial position with return of the rock-shaft by an actuating handle. Some such arrangement is preferred but may be omitted.

The advantages of the device are several. Marked convenience results from the fact that all doors are locked simultaneously, from the inside; and from either side of the car outside, and unlocked from the same or opposite side. Protection against theft is increased when the car is left by the fact that the outside actuating handles provide the only means of opening doors or other included closures, the inside actuating handle having been disengaged through their locking.

Safety is provided against accidents resulting from the opening of doors by children while the car is in motion, or by other occupants in grasping a door handle for support or through mistaking it for a window operator.

Protection is provided against entry by "stop-light bandits" or others. This is true even with the windows open for there is no means accessible outside or through a window to retract the latch of any door, the inside actuating handle being protected by the driver or out of reach.

The impact release would retract the latches in case of collision.

A practical embodiment of the device is illustrated in the accompanying drawings in which:

Figure 1 is a perspective view which is somewhat diagrammatic in character. It shows the inside actuating handle with the rock-shaft in latch-disengaging position; and the controlled latch mechanism mounted in the left-hand door post and controlling latches for both the front and rear left-hand doors in disengaged condition. The right-hand front door is shown closed and the dog to the inside actuating handle controlled by it retracted. The left-hand outside actuating handle is shown disengaged from the rock-shaft with the key about to be inserted in its lock.

Figure 2 shows the rock-shaft in plan view with both outside actuating handles, and the inside actuating handle dogged by the dog released by the open left-hand door while the right-hand door is indicated closed and its dog retracted.

Figure 3 is a perspective view from the outside of the left-hand door post, the latches, and the edges of the two doors with their latch keepers.

Figure 4 is a diagram showing in full lines the rock shaft and the inside actuating handle in latch-engaging position, and showing in dotted lines how the inside actuating handle can be shifted to move the rock-shaft to latch-disengaging position.

Figure 5 is a similar diagram showing the inside actuating handle in latch-disengaging position and indicating in full lines the position assumed by the rock-shaft when it is moved to latch-engaging position by one of the outside actuating handles. This figure shows how the inside actuating handle is then disconnected from the rock-shaft, but indicates in dotted lines how the restoration of the rock-shaft to latch disengaging position will reestablish operative relationship between the inside actuating handle and the rock-shaft.

Figure 6 is a diagram of the connection between the rock-shaft and one latch unit. The inside actuating handle, the rock-shaft, and a latch unit are shown in latch-releasing position in full lines and in latch-engaging position in dotted lines.

Referring first to Figures 1 and 3, 11 represents an ordinary channel-shaped left-hand door post, 12 the rear edge of the forward door and 13 the front edge of the rear door. This is a common door arrangement and has the advantage of allowing the use of a single operating mechanism for the auxiliary latches of both doors actuated by a single Bowden wire. Other arrangements would require a separate latch and corresponding Bowden wire for each door.

On opposite sides of the post 11 are hoods 14 and 15 open at their lower sides and housing latch elements 16 and 17. The left rear door 13 is recessed at 18 and is provided with a keeper 19 to coact with the latch 16. Similarly the left-hand forward door 12 is recessed at 21 and is provided with a keeper 22 which coacts with a latch 17. The latches 16 and 17 are fixed rigidly to the rock-shaft 23 which extends through the walls of the channel-shaped door post 11, outside the post and under the hoods 14 and 15 respectively.

The rock-shaft 23 carries two lever arms 24, each with a lug 25 at its upper end. The lugs 25 are engaged by forked ends of a double armed bell crank lever 26 which is pivoted on the trunnions 27 supported on door post 11. Journaled on a rock-shaft 28 also supported by door post 11 is a toggle lever 29. This lever 29 is connected to the yoke 26 by a coil compression toggle spring 31, thus producing a toggle mechanism which yieldingly biases member 26 and consequently the rock-shaft 23 in two opposite directions depending on the position of the lever 29.

Referring to Figure 1, if the right-hand end of the lever 29 is drawn up to the position shown in Figure 1, the outer end of the lever 26 is urged upward by the spring 31 so that the arms 24 are swung outward and the latches 16 and 17 are lifted to their inactive positions. This action can be better understood by an examination of Figure 6 which shows in full line the position just described.

If the right-hand end of the lever 29 be swung downward to the dotted line position of Figure 6, the thrust of the spring 31 on the member 26 is reversed, so that this turns counter-clockwise to the dotted line position of Figure 6, and moves the latches to engaging position. However, the latch is only yieldingly urged to this position and the keeper 22 may move under the latch 17 without moving the member 26 far enough to reverse the action of the toggle spring. Hence, in the dotted line position of Figure 6, the latches 17 and 16 function as spring-urged snap latches.

According to the construction shown, the latches 16 and 17 will move in unison because they both are fastened on the shaft 23. This avoids the necessity of duplicating the toggle mechanism for each latch and is sufficient because the ordinary hand-operated latches on the doors will hold the doors closed while latches 16 and 17 are shifting. If completely independent latch motion is desired, separate spring toggles for each latch can be used. The right-hand door latches have distinct spring toggle mechanisms from those which actuate the left-hand door latches, and this scheme of independent toggles can obviously be elaborated to any extent desired, within the scope of the invention.

The rock-shaft is indicated at 32 and is journaled at its ends in bearings 33, 33a mounted on the plates 34 which are parts of the cowl of the car body. Journaled in bearings 36, 36a concentric with the bearings 33, 33a, but on the outside of the car, are the hubs of the outside actuating handles 37, 37a. These handles are not normally connected with the shaft 32. The ends of the shaft 32 are cross-slotted as indicated at 38 in Figure 1, and mounted in the hub of each handle 37, 37a is a corresponding cylinder lock indicated at 39 in Figure 1 for handle 37. This may be operated by the key indicated at 41, when this key is inserted, which is, following known practice, preferably the ignition switch key.

By inserting the key 41 and turning it, the lock 39 projects the tongue 42 in an axial direction (see Fig. 1) so that it engages the corresponding slot 38 and forms a positive connection between the handle 37 (or 37a) and the rock-shaft 32. The rock-shaft 32 carries two arms 43, 43a rigidly fixed thereto and each connected with levers 29 of a corresponding latch mechanism by a flexible Bowden wire 44, 44a, which is guided in a flexible sheath 45, of a known form. The Bowden wires are housed in the framework of the body and are inaccessible.

Figure 2 shows the rock-shaft with levers 43, 43a and Bowden wires 44, 44a. The latch mechanism controlled by the wire 44a is that for the right hand doors of the car, and is not illustrated because it is simply a duplicate of that in the left-hand doors shown in Figures 1, 3 and 6. Any number of latch units can be actuated from a single shaft 32 by simple duplication of the construction described in detail as to the left-hand doors.

To prevent operation of the rock-shaft by the outside actuating handles 37 or 37a, the handles are merely unlocked from the rock-shaft. The normal condition is for both handles to be unlocked from the shaft. They are temporarily locked to the shaft only when it is desired to rotate the rock-shaft 32 for locking or unlocking purposes. Any locking mechanism suited to this purpose may be used. While releasable handles are preferred, any locking arrangement which may be set to prevent operation of the rock-shaft from outside the car without locking the rock-shaft itself against motion, may be substituted.

As explained, the shaft 32 is not accessible within the car, but is enclosed by a housing, part of which appears at 46 in Figure 2. Fixed on the rock-shaft 32 and projecting in a generally rearward direction therefrom is an arm 47 which at its extreme rearward end is forked; that is to say, it has two fingers 48 and 49 separated by an intervening slot. The finger 48 which is the lower one is longer than the finger 49. Journaled on a shaft 51 in the wall of the housing 46 is a lever 52 which is the inside actuating handle and which has a knob 53 at its outer end and at its inner end carries a pin or lug 54 designed to enter the slot between the fingers 48 and 49.

Assume now that the rock-shaft 32 is in unlatching position which is the dotted line position of Figure 4. The parts are so dimensioned that lug 54 can engage the projecting end of finger 48 but not finger 49. To set the latches from inside the car, the lever 52 is swung upward to the full-line position, Figure 4. Pin 54 enters the slot and becomes confined between the fingers 49 and 48, swinging the lever 47 downward, and rotating the shaft 32 to set all the latches to active position. Reverse movement of the lever 52 will restore the shaft 32 and retract all the latches. Approximately at the limit of motion of shaft 32 the pin 54 moves clear of the finger 49, the latch toggles through their Bowden wires having then shifted the lever 47 to its limiting position. This position must be assumed before any door can be opened.

Assume now that the driver, having opened the door and then closed it behind him, turns the shaft 32 to car locking position by operating one of the outside actuating handles 37 or 37a, having first engaged it to the rock-shaft 32 through use of the key. The lever 47 would swing down to the full-line position of Figure 5, leaving the lever 52 in its upper or normal position, where it is retained by friction and the weight of its handle. The lever 52 is thus rendered impotent to move the rock-shaft 32 by the simple act of shifting the rock-shaft to locking position by means other than the handle 52. Restoration of the rock-shaft 32 to the dotted line position of Figure 5 by operation of the handle 37 conditions the parts for a resumption of control by the handle 52; and will even restore lever 52 to the position of Figure 5 if it has been moved therefrom. Since the rock-shaft 32 is inaccessible from within as well as without the car, the act of moving the shaft 32 to locking position automatically disconnects handle 52 and thus makes it impossible to release the latches by any means operable without the use of the key.

As noted above, in order to open the door to leave, the operator must have placed the lever 52 and rock-shaft 32 in the positions indicated in Figure 4 by the dotted lines. If, with the door open, it were possible to restore the latches to the locking position indicated in the same figure by the solid lines he could leave the car and the doors would latch when closed. This would permit locking the doors from the outside without use of the key or an outside actuating handle. The inside actuating lever 52 would remain engaged with lever-arm 47 as indicated by solid lines in Figure 4, and the doors could be unlocked by reaching through an open or broken window and returning them to the dotted line positions. Further, if the key were left inside the car the driver himself would be locked out.

To prevent this, dogs 57 and 58 are provided. These dogs are urged toward engagement with the inside actuating handle 52 by means of spring 59, which encircles the shaft 50 on which the dogs are pivoted. (See Figs. 1 and 2.) In both these figures the dog 58 is shown retracted by the hinge 63 of the right-hand front door which draws on the cable 61 as the door closes. In Figure 2 the dog 57 is shown as engaging lever 52, the cable 60 being slackened by hinge 63a, as soon as the door 64a starts to open. Since the driver can only leave by a front door it is necessary only to control the dogs by opening of the front doors. Since the inside actuating handle must be in the position shown in Figure 1 for a front door to be unlatched and opening of either door releases a dog which inhibits motion from that position, the only means then operable to set the auxiliary latching mechanism is an outside actuating handle. It is, therefore, impossible to lock the key inside the car or, having locked the car from the outside, to unlock it by means of the inside actuating handle (assuming an open or broken window).

To meet a condition which might arise in case of a collision when the doors are locked from within, a lever 55 is shown fixed to the rock-shaft 32. It carries at its upper free end a substantial mass or weight 56. In the event of a collision (it being understood the car moves in the direction of the arrow A in Figure 4) the weight 56 would rotate the rock-shaft 32 and release the latches. This feature is optional and is indicated as typical of any emergency device for shifting the rock-shaft to unlocking position as an incident to an accident.

While a particular embodiment of the invention has been described in considerable detail, modifications are possible within the scope of the invention.

Latches are considered better than bolts or locks, because they can be set to active position and still permit an open door to be closed. Hence a latch structure is described to hold the doors without implying exclusion of other known devices which would hold the doors closed.

Similarly, a reversible biasing spring acting on the latch itself is probably the best, but is not the only way of rendering a latch alternatively active and inactive. Substitutions are possible.

The cross-shaft located under the cowl is preferred in certain body types. Others are obviously possible. Actuators not strictly of the shaft type can be evolved by the use of mechanical skill.

What is claimed is:

1. In a latch control mechanism for a vehicle having at least one door, the combination comprising, means for retaining said door in closed position; an inaccessible controller shiftable between two positions, a releasing position which renders said door retaining means inactive and a locking position which renders said door retaining means active; an inside actuator operable when said controller is in releasing position to positively shift the controller to locking position and then operable to positively shift it to releasing position; an outside actuator for positively shifting said controller to each of said positions and normally disconnected from said controller; locking means operable to connect and disconnect said outside actuator to and from said controller; and means rendered effective as an incident to the shift of said controller to locking position by said outside actuator to inhibit its operation by said inside actuator.

2. In a latch control mechanism for a vehicle having at least one door, the combination comprising, a latch operable to retain said door in closed position and to permit the open door to be moved to closed and latched position; an inaccessible controller shiftable between two positions, and including a biasing spring reacting upon said latch, the biasing effect thereof on said latch being reversed by such shift, the controller having a latch releasing position in which the biasing spring renders said latch inactive and a latching position in which the biasing spring renders said latch active; an inside actuator operable when said controller is in latch releasing position to shift the controller to locking position, and then operable to positively shift it to releasing position; an outside actuator normally disconnected from said controller; locking means operable to connect and disconnect said outside actuator to and from said controller; and means rendered effective as an incident to the shift of said controller to locking position by said outside actuator to inhibit its operation by said inside actuator.

3. In a latch control mechanism for a vehicle having a door post and a pair of doors which seat against said post, the combination comprising, means mounted in said door post for retaining both said doors in closed position; an inaccessible controller shiftable between two positions, a releasing position which renders said door-retaining means inactive and a locking position which renders said door-retaining means active; an inside actuator operable when said controller is in releasing position to positively shift the controller to locking position, and then operable to positively shift it to releasing position; an outside actuator for positively shifting said controller to each of said positions and normally disconnected from said controller; locking means operable to connect and disconnect said outside actuator to and from said controller; and means rendered effective as an incident to the shift of said controller to locking position by said outside actuator to inhibit its operation by said inside actuator.

4. In a latch control mechanism for a vehicle having a door post and a pair of doors which seat against said post, the combination comprising, a duplex latch mounted in said door post and operable to retain both doors in closed position and to permit either door if open to move to closed position and thereafter prevent its being opened; an inaccessible controller shiftable between two positions and including a biasing spring reacting upon said duplex latch, the biasing effect thereof on said latch being reversed by such shift, the controller having a releasing position in which the biasing spring renders said duplex latch inactive and a latching position in which the biasing spring renders said duplex latch active; an inside actuator operable when said controller is in releasing position to shift the controller to locking position and then operable to restore it to releasing position; an outside actuator normally disconnected from said controller; locking means operable to connect and disconnect said outside actuator to and from said controller and means rendered effective as an incident to the shift of said controller to locking position by said outside actuator to inhibit its operation by said inside actuator.

5. In a latch control mechanism for a vehicle having at least one door, the combination comprising, a spring latch adapted to prevent said door from moving from closed to open position and to permit it to move from open to closed and latched position; an inaccessible controller shiftable between two positions, a releasing position in which it renders said latch ineffective and a locking position in which it renders said latch effective; an inside actuator operable to positively shift said controller from its releasing position to its locking position and back to its releasing position; an outside actuator for positively shifting said controller to each of said positions and normally disconnected from said controller; locking means operable to connect and disconnect said outside actuator to and from said controller; and means, rendered effective as an incident to the shift of said controller to locking position by said outside actuator, to inhibit its actuation by said inside actuator until the controller is restored to releasing position.

6. In a latch control mechanism for a vehicle having at least one door, the combination comprising, means for retaining said door in closed position; an inaccessible controller shiftable between two positions, a releasing position in which it renders said door retaining means ineffective and a locking position which renders said door retaining means effective; two actuators for positively shifting said controller to each of said positions, the first of which is normally disconnected from said controller and includes key operated means for locking it to said controller, and the second of which is normally disconnected from the controller and is arranged to enter into actuating relationship with the controller if shifted when the latter is in releasing position; and means for preventing the second actuator from entering into actuating relationship with the controller when the latter has been moved from releasing position by said first actuator.

7. In a latch control mechanism for a vehicle body having at least one door on each side of the body, the combination comprising, spring latches, one for each door, and each adapted to prevent the corresponding door from moving from closed to open position and to permit it to move from open to closed position; an inaccessible controller shaft extending across the body to points adjacent the sides thereof and connected to control said latches and rotatable between two positions, a releasing position in which it serves to render said latches ineffective and a locking position in which it serves to render said latches effective; an actuator accessible within the body and disconnected from said shaft; means effective when the shaft is in releasing position to establish a two-way driving connection between said actuator and the shaft as an incident to motion of the actuator; an actuator outside of said body adjacent one end of said controller shaft; key operated locking means for connecting said latter actuator with said shaft; and means rendered effective as an incident to the rotation of said shaft to locking position by said outside actuator to inhibit the establishment of driving relation between the shaft and the inside actuator.

8. In a latch control mechanism for a vehicle body having a plurality of doors, the combination comprising, a door controller for locking all said doors closed and for unlocking the same; means to yieldably retain said controller in the locking and unlocking positions; an actuator for said controller normally disconnected therefrom and accessible from outside said body; key controlled means for placing said outside actuator alternately in and out of actuating connection with said controller; another actuator for said controller accessible inside the body; and means rendered effective as an incident to the shift of the controller to locking position by said first named actuator to prevent operation of the controller by said inside actuator.

9. In a latch control mechanism for a vehicle body having a plurality of doors, the combination comprising a door controller for locking all said doors closed and for unlocking the same; an actuator accessible inside the body for positively shifting said controller to the locking and the unlocking positions; key controlled means operable alternatively to permit and to prevent operation of said controller from a point outside the body; and means rendered effective as an incident to the shift of the controller to locking position from a point outside the body to inhibit actuation of said controller by the first named actuator.

10. In a latch control mechanism for a vehicle body having a plurality of doors, the combination comprising, a door controller for locking all said doors closed and for unlocking the same; an actuator for said controller accessible inside the body for positively shifting said controller to the locking and the unlocking positions; a second actuator for said controller adapted to be operated from outside the body; means for preventing the operation of said controller by said outside actuator; and means rendered effective by shift of said controller to door locking position by the second actuator for inhibiting its actuation by the first actuator.

11. In a latch control mechanism for a vehicle having a plurality of doors, the combination comprising, means for retaining said doors in closed position; an inaccessible controller shiftable between two positions, a releasing position which renders said door retaining means inactive and a locking position which renders said door retaining means active; an inside actuator operable when said controller is in releasing position and when all doors by which the vehicle operator might normally leave said vehicle are shut to shift the controller to locking position and then operable to shift it to releasing position; and means rendered effective the opening of one of said doors to prevent motion of said controller from releasing to locking position by said inside actuator.

12. In a latch control mechanism for a vehicle body having a plurality of doors, the combination comprising, latches, one for each door, each such latch, when engaged serving to hold its door closed; biasing means for said latches shiftable between two positions, in one of which the latches are biased in an engaging direction and in the other of which they are retained in disengaged position; an inaccessible controller shiftable to set said biasing means in one or the other of said positions; an inside actuator for shifting said controller operable inside the body; and an interlock rendered effective by opening of a door to inhibit the shifting of said controller to the latching position by said inside actuator.

13. In a latch control mechanism for a vehicle having a plurality of doors, the combination comprising, a latching device for each of said doors to retain said doors in their closed position, a controller connected to said latch devices for operating the same to latching and to unlatching positions, an actuator accessible inside said vehicle for positively shifting said controller to each position, another actuator accessible from outside of said vehicle with the aid of a key for positively operating said controller to each of said positions, means rendered effective as an incident to the shift of said controller to latching position by said outside actuator to inhibit its operation by said inside actuator; and means to yieldably retain said controller in each of said positions.

14. In a latch control mechanism for a vehicle having a plurality of doors, the combination comprising, a latching device for each of said doors to retain said doors in their closed position, a controller connected to said latch devices for operating the same to latching and to unlatching positions, an actuator accessible inside said vehicle for positively shifting said controller to each position, at least one actuator accessible from the outside of said vehicle for positively shifting said controller, and means rendered effective as an incident to the shift of said controller to latching position by an outside actuator to inhibit the return of said controller to the unlatching position by said inside actuator.

15. In a latch control mechanism for a vehicle having a plurality of doors, the combination comprising, means for retaining said doors in closed position, an inaccessible controller shiftable between two positions, a releasing position which renders said door retaining means inactive, and a locking position which renders said door retaining means active; an inside actuator operable when said controller is in releasing position to shift the controller to locking position and then operable to shift it to releasing position; means rendered effective by the opening of a door to prevent motion of said actuator from releasing position; an actuator accessible from outside said vehicle for positively shifting said controller with the aid of a key required within the car for the operation of said vehicle; means separate from either actuator to retain the controller in its limiting positions, and means rendered effective as an incident to the shift of said controller to locking position by said outside actuator to inhibit its operation by said inside actuator.

16. In a latch control mechanism for a vehicle body having at least one door on each side of the body, the combination comprising, spring latches, one for each door, and each adapted to prevent the coresponding door from moving from closed to open position and to permit it to move from open to closed position; an inaccessible controller shaft extending across the body connected to control said latches and rotatable between two positions, a releasing position in which it serves to render said latches ineffective and a locking position in which it serves to render said latches effective; an actuator accessible within the body and disconnected from said shaft; means effective when the shaft is in releasing position to establish a two-way driving connection between said actuator and the shaft as an incident to motion of the actuator; actuators accessible from outside of said body, one at each side thereof, for positively operating said shaft with the aid of a key to each of said positions; and means rendered effective as an incident to the rotation of said shaft to locking position by an outside actuator to inhibit the establishment of driving relation between the shaft and the inside actuator.

17. In a latch control mechanism for a motor vehicle having a plurality of doors, the combination comprising, means to simultaneously latch said doors from an outside point by a key required to be used within said vehicle for the operation of said vehicle, means to simultaneously latch said doors from a point within said vehicle, and means rendered effective by opening any door through which the vehicle operator might normally carry said key to inhibit the latching of said plurality of doors by said second-mentioned means when said door remains open.

18. In a latch control mechanism for a motor vehicle having a plurality of doors, the combination comprising, latch means for retaining said doors in closed position; an inaccessible controller shiftable between two positions, a releasing position which renders said door retaining means inactive, and a locking position which renders said door retaining means active; an outside actuator for shifting said controller to locking position with the aid of a key required within the car for the operation of said vehicle; and inside actuator for shifting the controller to locking position when all doors through which the operator of the vehicle might normally carry the key for use in connection with the outside actuator are closed, and means rendered effective through the opening of any of said latter doors to inhibit the actuation of said controller by said inside actuator during such time as said door remains open.

19. In a latch control mechanism for a vehicle having a plurality of closures, the combination comprising, a latching device to retain one of said closures in closed position, a controller connected to said latching device for operating the same, an actuator accessible inside said vehicle for shifting said controller, and mechanical interlock means for engagement with said actuator rendered effective by movement of another of said closures to inhibit the shifting of said controller by said inside actuator.

WILLIAM W. DODGE, Jr.

CERTIFICATE OF CORRECTION.

Patent No. 2,235,830. March 25, 1941.

WILLIAM W. DODGE, JR.

It is hereby certified that error appears in the printed specification of the above numbered patent requiring correction as follows: Page 5, second column, line 21, claim 11, after the word "effective" insert --by--; page 6, first column, line 22, claim 16, for "coresponding" read --corresponding--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.